(12) United States Patent
Park

(10) Patent No.: US 8,991,279 B2
(45) Date of Patent: Mar. 31, 2015

(54) STEERING COLUMN FOR VEHICLE

(71) Applicant: Mando Corporation, Pyeongtaek-si, Gyeonggi-do (KR)

(72) Inventor: Sung Hun Park, Anyang-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/969,168

(22) Filed: Aug. 16, 2013

(65) Prior Publication Data

US 2014/0047941 A1 Feb. 20, 2014

(30) Foreign Application Priority Data

Aug. 16, 2012 (KR) ........................ 10-2012-0089593

(51) Int. Cl.
*B62D 1/16* (2006.01)
*B62D 1/187* (2006.01)
*B62D 1/184* (2006.01)

(52) U.S. Cl.
CPC ................ *B62D 1/187* (2013.01); *B62D 1/184* (2013.01)
USPC ........................................... 74/492; 280/277

(58) Field of Classification Search
CPC .............. B62D 1/04; B62D 1/12; B62D 1/16; B62D 3/02; B62D 3/14; B62D 1/187; B62D 1/184
USPC .............................. 74/491–495; 280/777, 779
See application file for complete search history.

(56) References Cited

U.S. PATENT DOCUMENTS

| 5,131,287 | A * | 7/1992 | Stromberg | 74/493 |
| 5,606,891 | A * | 3/1997 | Tisell et al. | 74/493 |
| 6,272,947 | B1 * | 8/2001 | Howard | 74/499 |
| 6,367,840 | B1 * | 4/2002 | Duval et al. | 280/777 |
| 6,666,478 | B2 * | 12/2003 | Livengood | 280/775 |
| 7,281,448 | B2 * | 10/2007 | Li et al. | 74/493 |
| 7,364,198 | B2 * | 4/2008 | Peppler | 280/775 |
| 7,421,925 | B2 * | 9/2008 | Korzan et al. | 74/492 |
| 7,730,804 | B2 * | 6/2010 | Manwaring et al. | 74/493 |
| 7,882,761 | B2 * | 2/2011 | Cymbal et al. | 74/493 |
| 8,302,503 | B2 * | 11/2012 | Schnitzer et al. | 74/492 |
| 8,408,370 | B2 * | 4/2013 | Battlogg et al. | 188/267.2 |
| 2005/0081675 | A1 * | 4/2005 | Oshita et al. | 74/493 |
| 2005/0217407 | A1 * | 10/2005 | Yamamura | 74/492 |
| 2005/0248142 | A1 * | 11/2005 | Li et al. | 280/777 |
| 2005/0284251 | A1 * | 12/2005 | Inayoshi et al. | 74/492 |
| 2006/0000307 | A1 * | 1/2006 | Tanaka et al. | 74/492 |
| 2006/0207378 | A1 * | 9/2006 | Kramer et al. | 74/492 |
| 2006/0230863 | A1 * | 10/2006 | Rouleau et al. | 74/492 |
| 2006/0266151 | A1 * | 11/2006 | Avers et al. | 74/492 |
| 2007/0108754 | A1 * | 5/2007 | Eggers et al. | 280/777 |

(Continued)

FOREIGN PATENT DOCUMENTS

KR 10-1294437 B1 8/2013

*Primary Examiner* — William Kelleher
*Assistant Examiner* — Zakaria Elahmadi
(74) *Attorney, Agent, or Firm* — McDermott Will & Emery LLP

(57) ABSTRACT

Disclosed is a steering column for a vehicle. By the steering column, a manipulation convenience of the driver can be increased by performing a tilting or telescoping operation by using a pressure of air or oil without using an adjusting lever. Further, the number of components and manufacturing costs can be significantly reduced by easily adjusting an operating force of the actuator using a pressure of air or oil and an operating force of the lever according to the type of the vehicle.

9 Claims, 5 Drawing Sheets

(56) References Cited

U.S. PATENT DOCUMENTS

| | | |
|---|---|---|
| 2008/0196534 A1* | 8/2008 | Manwaring et al. ............ 74/492 |
| 2008/0238069 A1* | 10/2008 | Kumar et al. ................ 280/775 |
| 2008/0245627 A1* | 10/2008 | Battlogg et al. .......... 188/267.2 |
| 2009/0120229 A1* | 5/2009 | Shibazaki et al. .............. 74/492 |
| 2010/0064839 A1* | 3/2010 | Schnitzer et al. ............... 74/492 |
| 2010/0186535 A1* | 7/2010 | Scapozza ....................... 74/492 |
| 2011/0194946 A1* | 8/2011 | Bedard et al. ................ 417/44.1 |
| 2012/0024101 A1* | 2/2012 | Schnitzer et al. ............... 74/492 |
| 2013/0133460 A1* | 5/2013 | Uesaka ........................... 74/492 |
| 2013/0192408 A1* | 8/2013 | Witting et al. .................. 74/492 |

* cited by examiner

STEERING COLUMN FOR VEHICLE

CROSS-REFERENCE TO RELATED APPLICATION

This application claims priority from and the benefit under 35 U.S.C. §119(a) of Korean Patent Application No. 10-2012-0089593, filed on Aug. 16, 2012, which is hereby incorporated by reference for all purposes as if fully set forth herein.

BACKGROUND OF THE INVENTION

1. Field of the Invention

The present invention relates to a steering column for a vehicle, and more particularly to a steering column for a vehicle by which a manipulation convenience of the driver can be increased by performing a tilting or telescoping operation by using a pressure of air or oil without using an adjusting lever, and the number of components and manufacturing costs can be significantly reduced by easily adjusting an operating force of the actuator using a pressure of air or oil and an operating force of the lever according to the type of the vehicle.

2. Description of the Prior Art

In general, a steering column is an apparatus which surrounds a steering shaft transmitting a rotating force generated through manipulation of a steering wheel by a driver to a rack-pinion mechanism to support rotations of the steering shaft, and is coupled to a vehicle body through a bracket to fix a location of the steering shaft.

The steering column may further have a telescopic function or a tilting function for convenience of a driver. The tilt unit is a unit for adjusting a fixing angle of the steering wheel and the telescope unit is formed by coupling two hollow pipes to be extended or contracted in an axial direction thereof, and also has a function of absorbing impact energy while the steering shaft and the steering column are collapsed during a collision of the vehicle.

Thus, the steering apparatus may be classified into a telescopic or tilting steering apparatus according to a function thereof, and a tilting function may be added to the telescopic steering apparatus if necessary. A driver may adjust a protrusion degree or an inclination degree of the steering wheel in correspondence to a height or a body shape of the driver, smoothly manipulating a steering operation.

FIG. 1 is an exploded perspective view showing a part of a steering column for a vehicle according to the related art.

As shown in FIG. 1, the steering column for a vehicle according to the related art includes: an outer tube 100 accommodating a steering shaft 175; an inner tube 170 introduced into the outer tube 100; a lower mounting bracket 165 fixing the inner tube 170 to a vehicle body; an upper mounting bracket 105 installed at an upper side of the outer tube 100 to be fixed to the vehicle body; a distance bracket 180 integrally fixed to the outer tube 100 and having a telescope slot 185; a plate bracket 150 integrally formed with the upper mounting bracket 105 and in which a tilt slot 110 is formed to be long; a fixing gear 145 formed on an outer surface of the tilt bracket 150; an actuating gear 140 engaged with or disengaged from the fixing gear 145; a tilt bolt 130 passing through the tilt slot 110; a cam 135 engaged with the actuating gear 140; a washer 125 and a nut 120 fixing the cam 135 and an adjusting lever 115; and a gear spring 142 located between the actuating gear 140 and the fixing gear 145.

The tilting or telescopic operation is applied by fastening or releasing the adjusting lever 115 according to a principle in which the tilting or telescopic operation is not performed as the plate bracket 150 is narrowed to apply a pressing force to the outer tube 100 when the adjusting lever 115 is fastened so that the outer tube 100 and the inner tube 170 are attached to each other by a pressing force, and on the other hand, a pressing force between the outer tube 100 and the inner tube 170 disappears when the adjusting lever 115 is released, allowing a tilting or telescoping operation.

The telescopic operation is completed by releasing the adjusting lever 115, changing a location of the tilt bolt 130 along the telescope slot 185 formed in the distance bracket 180, and fastening the adjusting lever 115.

The tilting operation is completed by releasing the adjusting lever 115, changing a location of the tilt bolt 130 along the tilt slot 110, and fastening the adjusting lever 115.

While the outer tube 100 and the steering shaft 175 are fixed while the adjusting lever 115 is locked, the outer tube 100 and the inner tube 170 are tilted with respect to a tilt center 160 by the cam 135 or the steering column may be extended or contracted axially if the adjusting lever 115 is released.

However, the steering column for a vehicle according to the related art can perform a tilting or telescopic operation only when the adjusting lever is released or fastened by a force of a driver, deteriorating a manipulation convenience of the driver.

Further, loads are concentrated on the plate bracket and the distance bracket for fastening the steering column with the tilt bolt and the adjusting lever, so a support force and a strength of the column become vulnerable.

Further, in the steering column for a vehicle according to the related art, distributions of an actuating force of the adjusting lever become different according to a telescopic location, that is, a location of the telescope slot to which the tilt bolt is fixed during the tilting or telescopic operation.

SUMMARY OF THE INVENTION

Accordingly, the present invention has been made to solve the above-mentioned problems occurring in the prior art, and an object of the present invention is to prevent a load transmitted to a steering column from being concentrated to a part of the steering column, uniformly distribute an operating force of an adjusting lever, increase a strength of the entire column while maintaining a support force between an outer tube and an inner tube when the adjusting lever is fastened and released for a tilting or telescopic operation, thereby preventing deformation or damage of the steering column during manipulation of the steering wheel of a driver.

In accordance with another aspect of the present invention, there is provided a steering column for a vehicle, including: an upper column having a hollow shape in which a steering shaft is installed and having a first hinge unit and a second hinge unit; a sliding bracket, opposite lateral parts of which are coupled to the first hinge unit to be slid lengthwise during a telescopic operation; a support bracket in which the sliding bracket is positioned and having first slots in a lengthwise direction thereof; a hinge plate having hinge holes coupled to the second hinge unit at one side thereof and having second slots at an opposite side thereof; a support shaft passing through the first slots and the second slots; a support tube coupled to an outer peripheral side of the support shaft to support both lateral parts of the sliding bracket and separated into two parts; a lever, one end of which is coupled to the support shaft through the separated space of the support tube and an opposite end of which is coupled to an actuator; and an actuator coupled to the sliding bracket to move the opposite end of the lever.

According to the present invention, a manipulation convenience of the driver can be increased by performing a tilting or telescoping operation by using a pressure of air or oil without using an adjusting lever.

Further, the number of components and manufacturing costs can be significantly reduced by easily adjusting an operating force of the actuator using a pressure of air or oil and an operating force of the lever according to the type of the vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
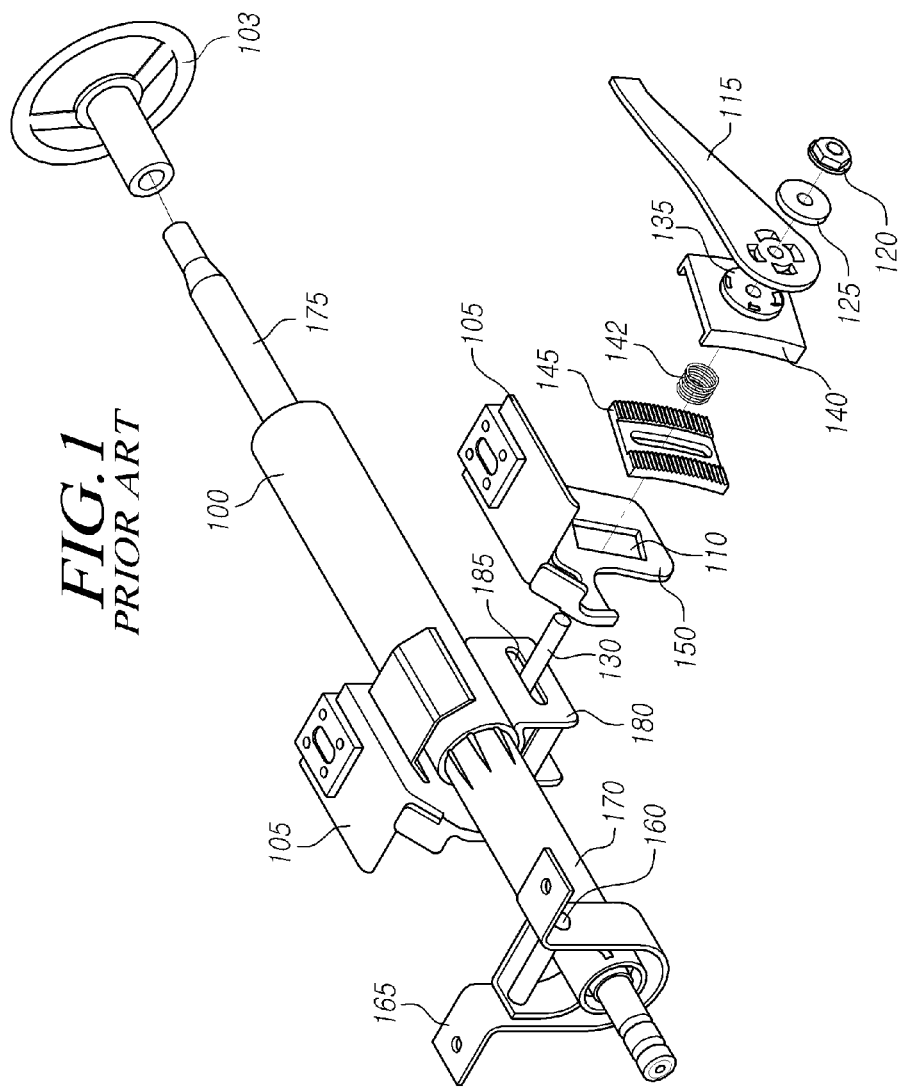
FIG. 1 is an exploded perspective view showing a part of a steering column for a vehicle according to the related art.

Hereinafter, exemplary embodiments of the present invention will be described with reference to the exemplary drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected", "coupled", or "coined" to another component, a third component may be "connected", "coupled", and "coined" between the first and second components, although the first component may be directly connected, coupled or joined to the second component.

Figure 2:
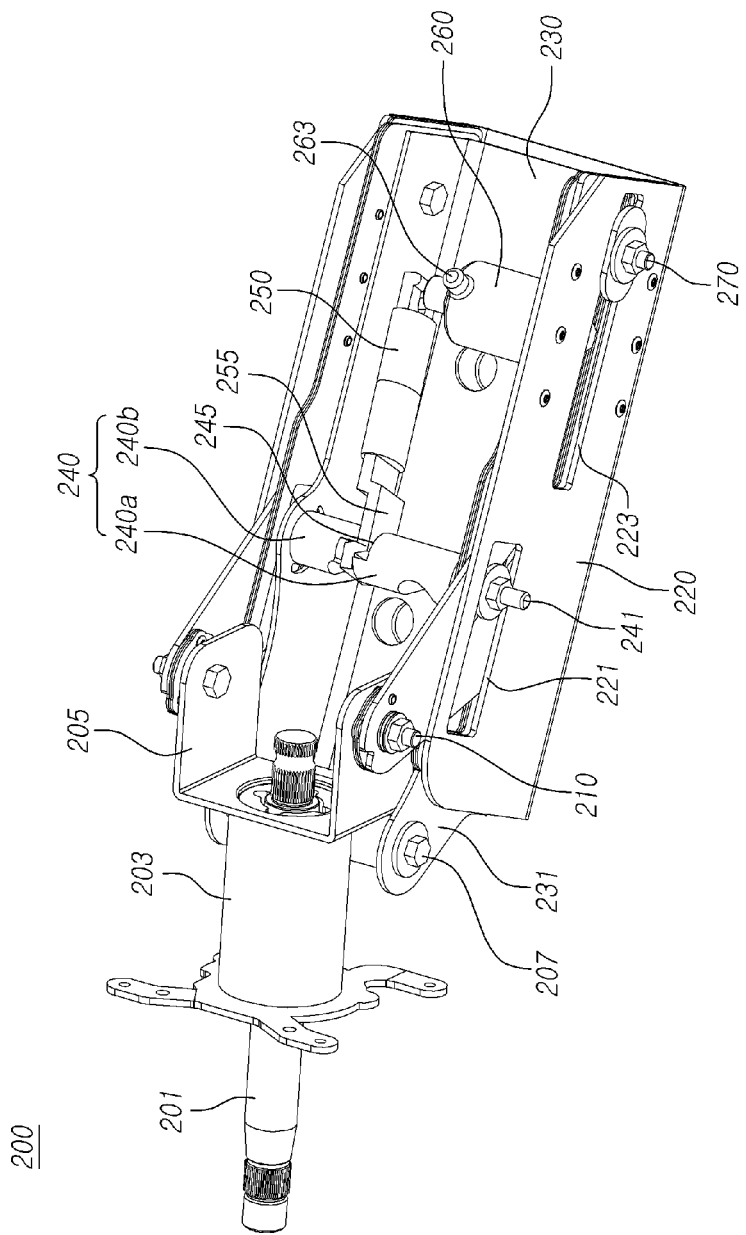
FIG. 2 is a perspective view showing a steering column for a vehicle according to an embodiment of the present invention.
Figure 3:
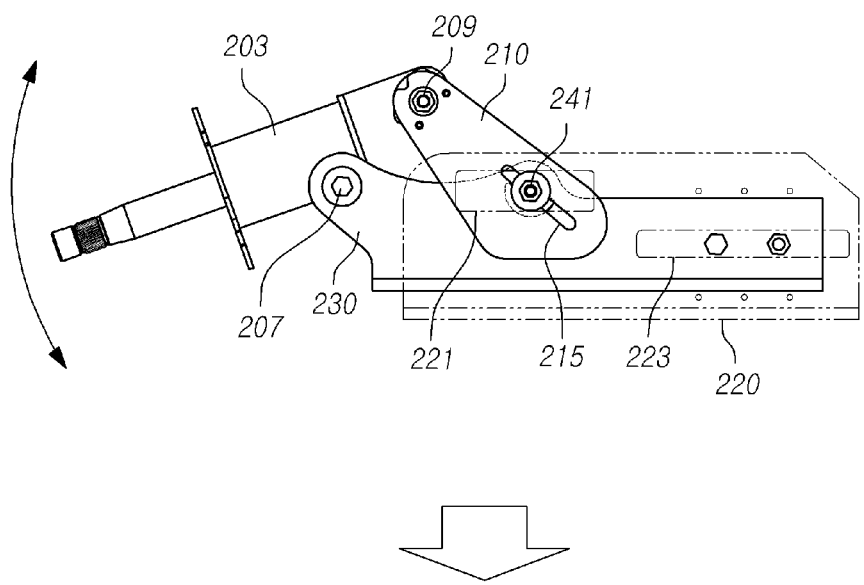
FIG. 3 shows sectional views of a tilting operation of the steering column for a vehicle according to the embodiment of the present invention.
Figure 3:
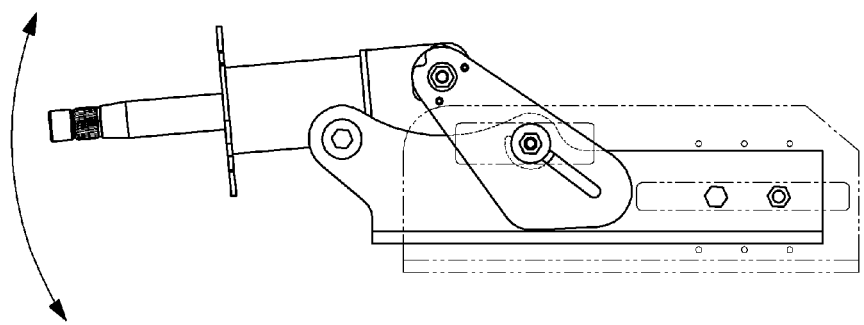
Figure 4:
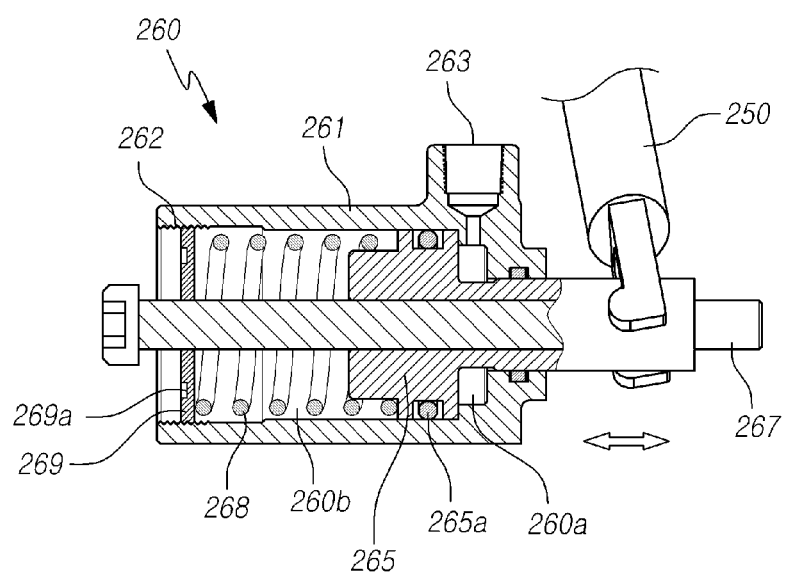
FIG. 4 is a sectional view showing an actuator of the steering column for a vehicle according to the embodiment of the present invention.
Figure 5:
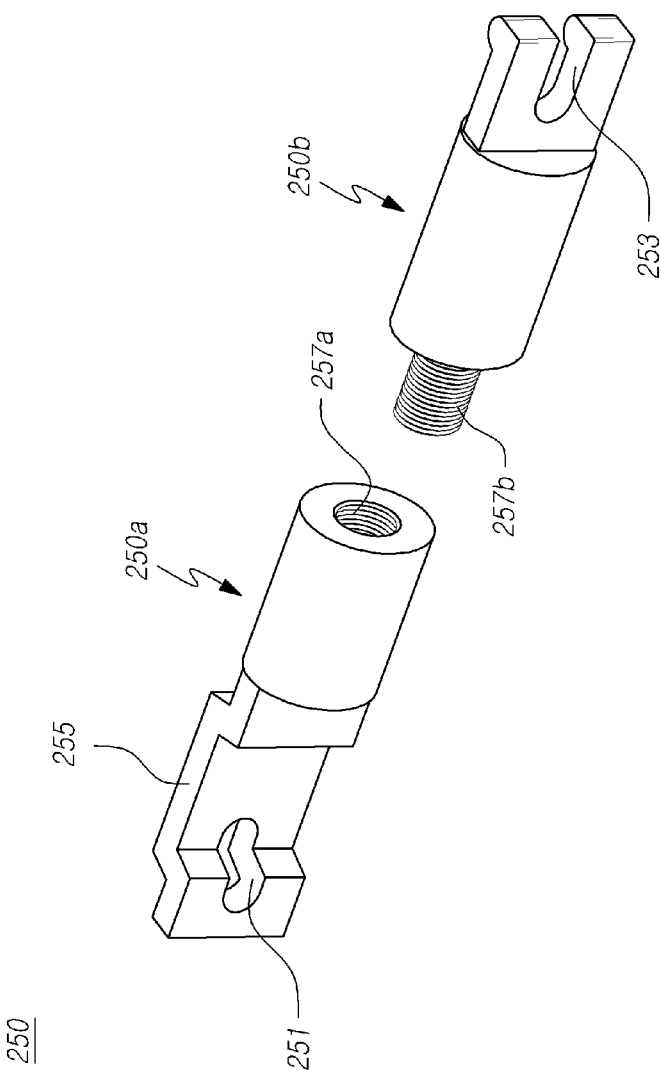
FIG. 5 is an exploded perspective view showing a lever of the steering column for a vehicle according to the embodiment of the present invention.

FIG. 2 is a perspective view showing a steering column for a vehicle according to an embodiment of the present invention. FIG. 3 shows sectional views of a tilting operation of the steering column for a vehicle according to the embodiment of the present invention. FIG. 4 is a sectional view showing an actuator of the steering column for a vehicle according to the embodiment of the present invention. FIG. 5 is an exploded perspective view showing a lever of the steering column for a vehicle according to the embodiment of the present invention.

As shown in the drawings, the steering column 200 for a vehicle according to the embodiment of the present invention includes: an upper column 203 having a hollow shape in which a steering shaft 201 is installed and having a first hinge unit 207 and a second hinge unit 209; a sliding bracket 230, opposite lateral parts 231 of which are coupled to the first hinge unit 207 to be slid lengthwise during a telescopic operation; a support bracket 220 in which the sliding bracket 230 is positioned and having first slots 221 in a lengthwise direction thereof; a hinge plate 210 having hinge holes coupled to the second hinge unit 209 at one side thereof and having second slots 215 at an opposite side thereof; a support shaft 241 passing through the first slots 221 and the second slots 215; a support tube 240 coupled to an outer peripheral side of the support shaft 241 to support both lateral parts 231 of the sliding bracket 230 and separated into two parts; a lever 250 one end of which is coupled to the support shaft 241 through the separated space of the support tube 240 and an opposite end of which is coupled to the actuator 260; and an actuator 260 coupled to the sliding bracket 230 to move the opposite end of the lever 250.

The steering column 200 for a vehicle according to the embodiment of the present invention may perform a tilting or telescopic function due to a pressure by which the sliding bracket 230 and the support bracket 220 are fastened as the lever 250 applies a force to the support tube 240 in opposite directions with the help of the actuator 260 operated by a pressure of a fluid such as air or oil.

The upper column 203 has a hollow shape in which the steering shaft 201 is installed and includes the first hinge unit 207 and the second hinge unit 209 so that a tilting operation of the upper column 203 can be performed while the first hinge unit 207 acts as an axis thereof, in which case a tilting rotation can be accommodated along the second slots 215 of the hinge plate 210 coupled to the second hinge unit 209 installed at a lower end of the upper column 203.

The first hinge unit 207 is formed on an outer peripheral surface of a tube shape of the upper column 203 and opposite flanges 205 are formed at lower ends of the first hinge unit 207. The second hinge unit 209 is installed at opposite sides of the flanges 205 and the hinge plate 210 is rotatably coupled to the second hinge unit 209 through coupling members.

The sliding bracket 230 has a substantially square shape, one end of which is opened to include opposite lateral parts 231 and the opposite lateral parts 231 are coupled to the first hinge unit 207 of the upper column 203 so that the sliding bracket 230 can be slid in a lengthwise direction thereof while being supported by the support bracket 220 having a corresponding shape during a telescopic operation.

The support bracket 220 in which the sliding bracket 230 is positioned to be coupled to the support bracket 220 has the first slots 221 in a lengthwise direction thereof on opposite sides coupled to the lateral parts 231 of the sliding bracket 230 to be operated along the first slots 221 when the upper column 203 is telescopically operated together with the sliding bracket 230, the hinge plate 210, and the support shaft 241.

Third slots 223 are formed in a lengthwise direction of the support bracket 220 at locations spaced apart from the first slots 221 and a guide 270 is installed at an opposite side of the lateral parts of the sliding bracket 230, so that the guide 270 can support and guide the telescopic movement of the upper column 203 and the sliding bracket 230 while being moved along the third slots 223 during the telescopic operation.

Hinge holes coupled to the second hinge unit 209 of the upper column 203 are formed at one side of the hinge plate 210, and the second slots 215 accommodating a tilting rotation of the upper column 203 are formed at an opposite side thereof.

The support shaft 241 passes through the first slots 221 and the second slots 215 and is coupled by coupling members, so that the support shaft 241 is moved along the second slots 215 of the hinge plate 210 during a tilting operation of the upper column 203 and the support shaft 241 is moved along the first slots 221 during a telescopic operation.

Meanwhile, in order that the tilting or telescopic operation is performed only in a special case, that is, only when the tilting or telescopic operation is intended by a user, the support tube 240 normally applies a force of attaching the sliding bracket 230 and the hinge plate 210 to both the lateral parts of the support bracket 220 with the actuator 260, and removes the applied force during the tilting or telescopic operation to the contrary.

The support tube 240 separated into two parts 240a and 240b is coupled to an outer peripheral side of the support shaft 241 and the lever is inserted into the separated space, so that the support tube 240 supports both the lateral parts of the sliding bracket 230 while being widened.

One end of the lever 250 is coupled to the support shaft 241 through the separated space of the support tube 240 and an opposite end of the lever 2450 is coupled to a piston 265 of the actuator 260, so that the support tube 240 is widened or shrunk as the piston 265 is linearly moved to one side by the actuator 260.

The actuator 260 is coupled and fixed to the sliding bracket 230, and the piston 265 linearly moved along an interior of the actuator 260 is coupled to the opposite end of the lever 250 to move the lever 250.

The actuator 260 has a coupling part 263 to which a nozzle, through which air or oil is introduced and discharged, is coupled at one side of the housing 261, and two spaces divided by the piston 265 are provided in the housing 261. Air or oil is filled in a cylinder chamber 260a communicating with the nozzle and a resilient member 268 is installed in another chamber.

The piston 265 is supported by and coupled to the rod 267 and the lever 250 is coupled to one side of the piston 265 so that the piston can be slid in the housing 261 by a resilient pressure of the resilient member 268 or a pressure of air or oil. A sealing member 265a is inserted between the housing 261 and a step of the piston 265 to prevent leakage of air or oil.

The resilient member 268 supporting one side of the piston 265 is installed in a space on one side of the actuator 260, and a support plate 269 coupled to an inner side of the housing 261 to support the resilient member 268 is coupled to an opposite side of the resilient member 268.

Threaded portions are formed at an inner surface of one end of the housing 261 and an outer peripheral surface of the support plate 269, so that a resilient force of the resilient member 268, that is, a force by which the support tube 240 supports both lateral parts of the sliding bracket 230 can be adjusted according to a location where the support plate 269 is fixed to the housing 261 while being screw-coupled to the housing 261.

A tool recess 269a is formed in the support plate 269 to be rotated by a tool from the outside, so that a resilient force of the resilient member 268 can be easily adjusted.

Due to the actuator 260, the tilting or telescopic operation can be applied by a separate operation switch for operating the actuator 260 without operating the adjusting lever 250 unlike the related art.

In a description of an operation of the actuator 260, normally, the piston 265 is pushed to the outside of the actuator 260 as the volume of the cylinder chamber 260a becomes smaller by the resilient restoring force of the resilient member 268 which is compressed while air or oil can be freely introduced or discharged through the nozzle, increasing a force by which the support tube 240 supports the lateral parts of the sliding bracket 230.

On the other hand, during the tilting or telescopic operation, the piston 265 is pushed to the inside of the actuator 260 as the volume of the cylinder chamber becomes larger while a pressure of the air or oil introduced through the nozzle becomes higher, eliminating a force by which the support tube 240 supports the lateral parts of the sliding bracket 230.

A through-hole 251 through which the support shaft 241 passes is formed at one end of the lever 250 and a coupling groove 253 coupled to the piston 265 of the actuator 260 is formed at an opposite end thereof, so that the actuator 260, the piston 265, and the support shaft 241 can be operated in conjunction with each other.

A stepped portion 245 stepped in the direction of the support shaft 241 is formed on the separated surface of the support tube 240 and a stepped portion 255 corresponding to the stepped portion 245 of the support tube 240 is formed at one end of the lever 250, so that the support tube 240 can be easily widened to opposite sides while the lever 250 acts as an leverage if the actuator 260 operates the rod 267.

Meanwhile, the lever 250 is separated into two parts, and a coupling recess 257a is formed at one of the separated sides and a coupling boss 257b protruding to correspond to the coupling recess 257a is formed at the other of the separated sides. Threaded portions are formed in the coupling recess 257a and the coupling boss 257b, so that an operating force of the lever 250 can be adjusted by adjusting a length of the lever 250 according to a fixed position thereof while the coupling boss 257b is screw-coupled to the screw recess 257a.

According to the steering column for a vehicle of the present invention having the above-described structure and shape, a manipulation convenience of the driver can be increased by performing a tilting or telescoping operation by using a pressure of air or oil without using an adjusting lever.

Further, the number of components and manufacturing costs can be significantly reduced by easily adjusting an operating force of the actuator using a pressure of air or oil and an operating force of the lever according to the type of the vehicle.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included.

All of the terminologies containing one or more technical or scientific terminologies have the same meanings that persons skilled in the art understand ordinarily unless they are not defined otherwise.

A term ordinarily used like that defined by a dictionary shall be construed that it has a meaning equal to that in the context of a related description, and shall not be construed in an ideal or excessively formal meaning unless it is clearly defined in the present specification.

Although an exemplary embodiment of the present invention has been described for illustrative purposes, those skilled in the art will appreciate that various modifications, additions and substitutions are possible, without departing from the scope and spirit of the invention as disclosed in the accompanying claims.

Therefore, the embodiments disclosed in the present invention are intended to illustrate the scope of the technical idea of the present invention, and the scope of the present invention is not limited by the embodiment.

The scope of the present invention shall be construed on the basis of the accompanying claims in such a manner that all of the technical ideas included within the scope equivalent to the claims belong to the present invention.

What is claimed is:

1. A steering column for a vehicle, comprising:
    an upper column having a hollow shape in which a steering shaft is installed and having a first hinge unit and a second hinge unit;
    a sliding bracket, opposite lateral parts of which are coupled to the first hinge unit to be slid lengthwise during a telescopic operation;
    a support bracket in which the sliding bracket is positioned and having first slots in a lengthwise direction thereof;
    a hinge plate having hinge holes coupled to the second hinge unit at one side thereof and having second slots at an opposite side thereof;
    a support shaft passing through the first slots and the second slots;
    a support tube coupled to an outer peripheral side of the support shaft to support both lateral parts of the sliding bracket and separated into a first part and a second part; and
    a lever, one end of which is coupled to the support shaft through the separated space of the support tube and an opposite end of which is coupled to an actuator,
    wherein the actuator is coupled to the sliding bracket to move the opposite end of the lever so as to apply a force to the first and second parts in opposite directions, and
    wherein in the actuator, a nozzle through which air or oil is introduced or discharged is installed at one side of a housing, a cylinder chamber communicating with the nozzle is formed in the housing, and a piston coupled to the lever is installed in the cylinder chamber.

2. The steering column as claimed in claim 1, wherein third slots are formed in the support bracket in a lengthwise direction thereof at locations spaced apart from the first slots and a guide is installed at an opposite side of the lateral parts of the sliding bracket so that the guide is guided along the third slots during a telescopic operation.

3. The steering column as claimed in claim 1, wherein a sealing member is inserted between the housing and the piston.

4. The steering column as claimed in claim 3, wherein a resilient member supporting one side of the piston is installed in the actuator, and a support plate coupled to an inner side of the housing to support the resilient member is coupled to an opposite side of the resilient member.

5. The steering column as claimed in claim 4, wherein threaded portions are formed on an inner surface of the housing and an outer peripheral surface of the support plate so that a resilient force of the resilient member is adjusted while the support plate is screw-coupled to the housing.

6. The steering column as claimed in claim 2, wherein a stepped portion stepped in the direction of the support shaft is formed on the separated surface of the support tube.

7. The steering column as claimed in claim 6, wherein a stepped portion corresponding to the through-hole through which the support shaft passes and the stepped portion of the support tube is formed at one end of the lever, and a coupling recess coupled to the piston of the actuator is formed at an opposite end of the lever.

8. The steering column as claimed in claim 7, wherein the lever is separated into two parts, and a coupling recess is formed at one of the separated sides and a coupling boss protruding to correspond to the coupling recess is formed at the other of the separated sides.

9. The steering column as claimed in claim 8, wherein threaded portions are formed in the coupling recess and the coupling boss so that a length of the lever is adjusted by screw-coupling the screw boss to the screw recess.

* * * * *